(12) United States Patent
Oder et al.

(10) Patent No.: US 6,540,088 B2
(45) Date of Patent: Apr. 1, 2003

(54) METHOD AND APPARATUS FOR SORTING PARTICLES WITH ELECTRIC AND MAGNETIC FORCES

(75) Inventors: Robin R. Oder, Export, PA (US); Russell E. Jamison, Lower Burrell, PA (US)

(73) Assignee: EXPORTech Company, Inc., New Kensington, PA (US)

( * ) Notice: Subject to any disclaimer, the term of this patent is extended or adjusted under 35 U.S.C. 154(b) by 0 days.

(21) Appl. No.: 09/908,115

(22) Filed: Jul. 18, 2001

(65) Prior Publication Data

US 2002/0014440 A1 Feb. 7, 2002

Related U.S. Application Data

(63) Continuation-in-part of application No. 09/289,929, filed on Apr. 14, 1999, now abandoned.

(51) Int. Cl.[7] .............................. B03C 1/18; B03C 1/30; B03C 7/12
(52) U.S. Cl. ........................ 209/218; 209/212; 209/128; 209/219
(58) Field of Search ............................... 209/212, 12.2, 209/3, 127.1, 218, 215, 2, 213, 222, 225, 219, 127, 129, 130, 127.3, 127.4

(56) References Cited

U.S. PATENT DOCUMENTS

| | | | | |
|---|---|---|---|---|
| 794,647 A | * | 7/1905 | Sutton et al. | 209/12.2 |
| 2,866,546 A | * | 12/1958 | Roberts | 209/12.2 |
| 2,889,042 A | * | 6/1959 | Baron | 209/127.1 |
| 3,012,668 A | * | 12/1961 | Fraas | 209/127.1 |
| 3,059,772 A | * | 10/1962 | Baron | 209/127.1 |
| 3,322,275 A | * | 5/1967 | Breakiron et al. | 209/127.1 |
| 4,116,822 A | * | 9/1978 | Webb | 209/11 |
| 4,530,291 A | * | 7/1985 | Wysk | 209/215 |
| 4,834,870 A | * | 5/1989 | Osterberg et al. | 209/38 |
| 4,882,043 A | * | 11/1989 | Jung | 209/12.2 |
| 5,394,991 A | * | 3/1995 | Kumagai et al. | 209/212 |
| 5,423,433 A | * | 6/1995 | Arnold et al. | 209/636 |
| 5,513,755 A | * | 5/1996 | Heavilon et al. | 209/2 |
| 5,626,233 A | * | 5/1997 | Wells, II | 209/219 |
| 5,735,402 A | * | 4/1998 | Pezzoli et al. | 209/129 |
| 5,746,320 A | * | 5/1998 | Fujita et al. | 209/127.3 |
| 5,797,498 A | * | 8/1998 | Kobayashi et al. | 209/636 |
| 5,885,330 A | * | 3/1999 | Lee | 209/127.1 |
| 6,034,342 A | * | 3/2000 | Schmoutziguer et al. | 209/127.1 |
| 6,041,942 A | * | 3/2000 | Goolsby | 209/219 |
| 6,062,393 A | * | 5/2000 | Knoll | 209/219 |
| 6,068,133 A | * | 5/2000 | Schonfeld et al. | 209/219 |

FOREIGN PATENT DOCUMENTS

| | | | | |
|---|---|---|---|---|
| CH | 541996 | * | 11/1973 | 209/127.1 |
| DE | 206940 | * | 2/1984 | 209/12.2 |
| JP | 7105515 | * | 4/1965 | 209/127.1 |
| SU | 1627255 | * | 2/1991 | 209/12.2 |

* cited by examiner

Primary Examiner—Donald P. Walsh
Assistant Examiner—Daniel K Schlak
(74) Attorney, Agent, or Firm—Ansel M. Schwartz

(57) ABSTRACT

An apparatus for sorting particles. The apparatus includes a magnet mechanism for separating the particles with a magnetic force. The apparatus includes an electric mechanism for separating particles with an electrical force disposed adjacent to the magnet mechanism. The apparatus includes a mechanism for providing the particles to the magnet mechanism and the electric mechanism. The providing mechanism is engaged with the magnet mechanism and the electric mechanism. A method for sorting particles. The method includes the steps of providing the particles to a magnet mechanism and electric mechanism disposed adjacent to the magnet mechanism. Then there is the step of separating the particles with the magnetic force from the magnet mechanism and the electric force from the electric mechanism.

21 Claims, 7 Drawing Sheets

METHOD AND APPARATUS FOR SORTING PARTICLES WITH ELECTRIC AND MAGNETIC FORCES

CROSS REFERENCE TO RELATED APPLICATIONS

This application is a Continuation-In-Part of application Ser. No. 09/289,929 which was filed on Apr. 14, 1999, now abandoned.

This invention was made with Government support under Grant DMI-9760706 awarded by the National Science Foundation. The Government has certain rights in this invention.

FIELD OF THE INVENTION

The present invention relates to a method and apparatus for sorting particles. More specifically, the present invention relates to a method and apparatus for sorting particles using electric and magnetic forces where the particles are electrically charged by friction and by capacitive contact.

BACKGROUND OF THE INVENTION

The present invention is directed to the separation of magnetically similar particles which otherwise have dissimilar surface electric characteristics. An example of commercial significance is the separation of unburned carbon from fossil-fuel-combustion fly ash. Pulverized coal fly ash with a mean particle size of about 10 to 30 microns is collected dry by electrostatic precipitators to prevent emission to the atmosphere. The fly ash is primarily composed of cenospheres of aluminum-, silicon-, and ferruginous-oxides which tend to be strongly magnetic with apparent paramagnetic susceptibilities of the order of 100 to $10,000*10^{-6}$ cm$^3$/g. The cenospheres are pozzolans and have significant value as extenders for portland cement in construction applications. When diluted with a few percent by weight of unburned carbon, however, they are virtually worthless and must be disposed. The unburned carbon, called Loss On Ignition, LOI, is increasing at fossil-fuel-fired power plants because of the advent of new burner technology designed to lower emissions of nitrogen oxides, $NO_x$. The carbon chards remaining after combustion can incorporate significant amounts of the cenospheres so carbon/cenosphere composites with varying levels of magnetism are contained in the fly ash. Because of this, attempts to separate unburned carbon from pulverized coal fly ash using magnetic separation technology have had only limited success due to the distribution of magnetism in the carbon component.

Another area that the present invention is directed to is the separation of particles which have similar surface electrical characteristics but, otherwise, have differing magnetic properties. An example is paramagnetic and diamagnetic minerals found in coal. These minerals are all undesirable because they dilute the heat content of coal and result in slagging and fouling in coal combustion. While these minerals are of distinctly differing magnetism, they generally exhibit the same triboelectric charge which is negative. Another example is the separation of nanosized magnetic particles, such as magnetite, prepared by carbon plasma arc deposition. In the arc method, some particles are created which are smaller than the critical size for formation of magnetic domains. When the particle diameter is below nominally $500*10^{-8}$ centimeters, the critical domain size for magnetite, they do not exhibit typical properties of ferromagnets. Subdomain sized magnetite particles are superparamagnetic. They are characterized by a magnetic susceptibility and do not exhibit a locked in magnetic moment or hysteresis. Ferromagnetic magnetite particles are used as magnetic media for information storage. Fine particle size offers the potential for greater storage density. Superparamagnetic particles also offer new methods for information storage not now used in this industry. Currently, however, the separation of subdomain sized particles from the carbon arc product is limited by the electrostatic size classification method employed. The electrostatic technology cannot be scaled to commercial throughput which limits the potential for using nanosized magnetic particles to the laboratory.

SUMMARY OF THE INVENTION

The present invention pertains to an apparatus for sorting particles. The apparatus comprises a magnet mechanism for separating the particles with a magnetic force. The apparatus comprises an electric mechanism for separating particles with an electrical force disposed adjacent to the magnet mechanism. The apparatus comprises a mechanism for providing the particles to the magnet mechanism and the electric mechanism. The providing mechanism is engaged with the magnet mechanism and the electric mechanism.

The present invention pertains to a method for sorting particles. The method comprises the steps of providing the particles to a magnet mechanism and electric mechanism disposed adjacent to the magnet mechanism. Then there is the step of separating the particles with the magnetic force from the magnet mechanism and the electric force from the electric mechanism.

The present invention pertains to an apparatus for sorting material having paramagnetic material and diamagnetic material. The apparatus comprises a region for introducing triboelectric charge to the paramagnetic material and the diamagnetic material. The apparatus comprises a magnetic region having stronger magnetic fields and weaker magnetic fields that cause paramagnetic material to move to the stronger magnetic fields and diamagnetic material to move to the weaker magnetic fields. The apparatus comprises an electric region overlapping with the magnetic region having an electric field which causes positively charged diamagnetic material to move in a first direction and negatively charged diamagnetic material to move in a second direction different from the first direction. The magnetic region and electric region are in communication with the region for introducing triboelectric charge.

The present invention pertains to a method for sorting material having paramagnetic material and diamagnetic material. The method comprises the steps of introducing triboelectric charge to the paramagnetic material and the diamagnetic material. There is the step of applying a magnetic force to the paramagnetic material and the diamagnetic material to separate the paramagnetic material from the diamagnetic material. There is the step of applying an electric force, which acts in conjunction with the magnetic force, to the diamagnetic material to separate positively charged diamagnetic material from negatively charged diamagnetic material.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
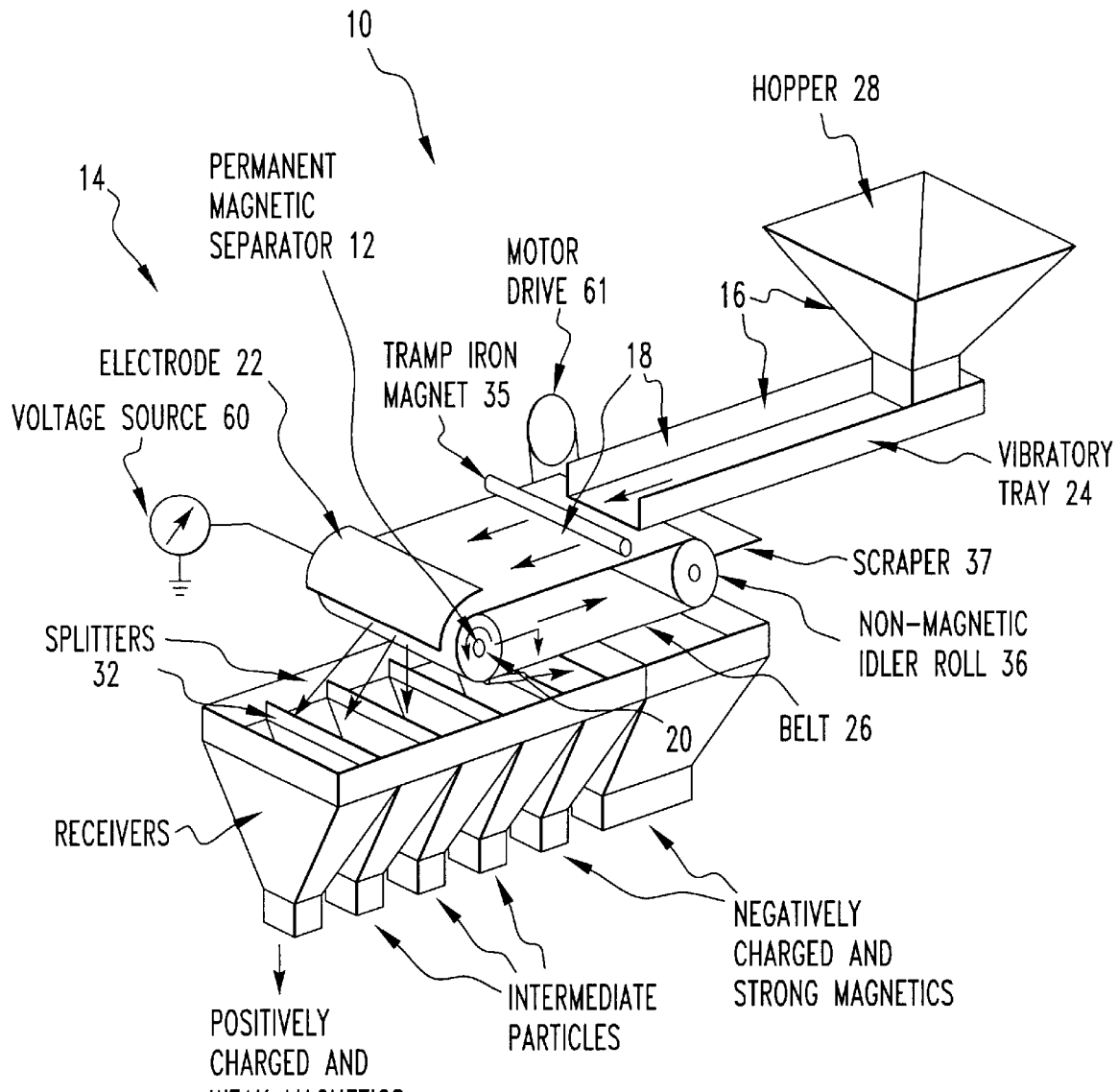
FIG. 1 is a schematic representation of an apparatus of the present invention.

Referring now to the drawings wherein like reference numerals refer to similar or identical parts throughout the several views, and more specifically to FIG. 1 thereof, there is shown an apparatus 10 for sorting particles. The apparatus 10 comprises a magnet mechanism 12 for separating the particles with a magnetic force. The apparatus 10 comprises an electric mechanism 14 for separating particles with an electrical force disposed adjacent to the magnet mechanism 12. The apparatus 10 comprises a mechanism for providing the particles to the magnet mechanism 12 and the electric mechanism 14. The providing mechanism 16 is engaged with the magnet mechanism 12 and the electric mechanism 14.

Preferably, the providing mechanism 16 includes a mechanism for imparting an electric charge to the particles. The magnet mechanism 12 rotates about a horizontal axis 20. Preferably, the electric mechanism 14 includes an electrode 22. The electrode 22 is preferably disposed adjacent the magnet mechanism 12 so a voltage difference is applied between the electrode 22 and the magnet mechanism 12 by DC voltage source 60. Particles which are magnetic will be attracted to the magnet mechanism 12 but repelled by inertia and electrical forces if they are charged the same way as the magnet mechanism 12, with a balance of forces on each particle dictating where the particle goes as the magnet mechanism 12 rotates.

Preferably, the imparting mechanism 18 includes a vibratory tray 24 upon which the particles are vibrated and creates triboelectric charges in the particles by contact of the particles with the vibratory tray 24 and among themselves. The imparting mechanism 18 preferably includes a feeder belt 26 which receives particles from the vibratory tray 24 and carries them to the magnet mechanism 12 and creates triboelectric charges in the particles by contact of the particles with the feeder belt 26 and among themselves.

Preferably, the providing mechanism 16 includes a feeder hopper 28 through which the particles are fed to the vibratory tray 24. Preferably the providing mechanism 16 includes a permanent magnet 35 suspended over the belt 26 near the exit of the vibratory feeder tray 24 for removing tramp iron from the feed to the permanent magnet separator 12.

The particles preferably release from the magnet mechanism 12 at various angular locations around the axis of rotation 20 depending upon the angular velocity of rotation, the radius of the magnet mechanism 12, the voltage applied to the magnet mechanism 12, the magnetic force of attraction produced by the magnet mechanism 12, the electrical properties of the belt 26, and the size, weight, the electric charge of the particles, and aerodynamic drag force.

Figure 4:
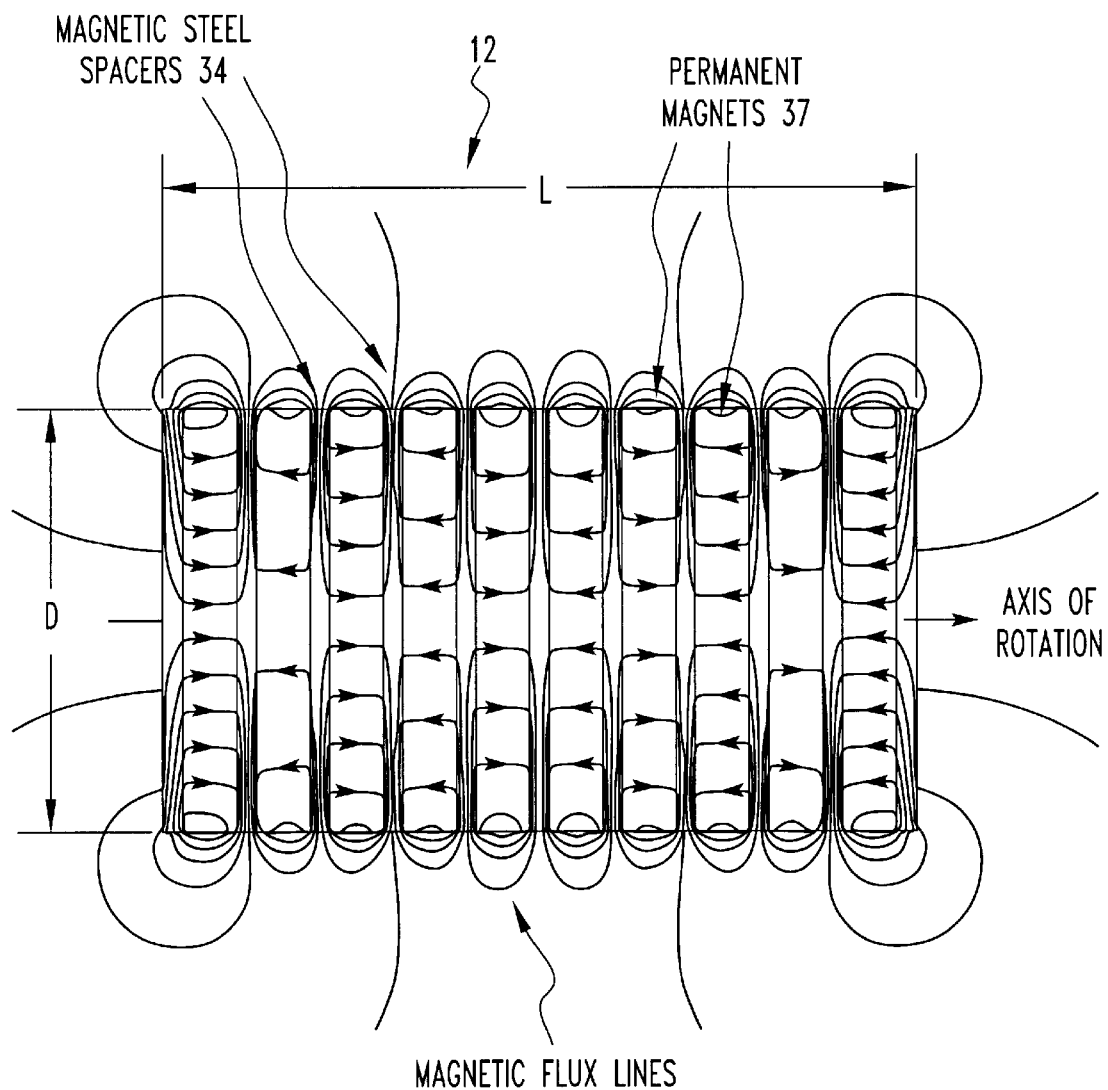
FIG. 4 shows magnetic flux lines in permanent magnet separator.

Preferably, the apparatus 10 includes mechanical splitters 32 aligned with the magnet mechanism 12 which separates particles that leave the magnet mechanism 12 into streams of differing magnetic, electric, mechanical and chemical attributes. The magnet preferably comprises a cylindrical arrangement of alternating segments of permanent magnets 37 separated by magnetic steel spacers 34, where the permanent magnets are magnetized parallel to the axis of the cylinder and are arranged so that the nearest faces are magnetized in opposite directions with the magnetic flux from the magnet emerging radially over the surfaces of the steel spacers 34, as shown in FIG. 4.

Preferably, the applied electric field strength is up to the breakdown strength of air. Preferably, the voltage is up to 20,000 volts. The electrode 22 is preferably as close as 7 millimeters with the magnet and may be as far away as 50 mm. Preferably, the electrode 22 is located from 0 degrees to 90 degrees with respect to the horizontal axis 20. The particles are preferably between 0.05 micron and 2.4 millimeters in diameter.

Preferably, particles with low work function give up electrons and become positively charged, while particles with large work function acquire electrons and become negatively charged. The particles are preferably weakly magnetic such as diamagnetic or paramagnetic or strongly magnetic such as ferromagnetic or anti-ferromagnetic or mixtures thereof. Preferably, the magnet rotates at a variable speed to enhance the electric and magnetic separation of the particles.

The present invention pertains to a method for sorting particles. The method comprises the steps of providing the particles to a magnet mechanism 12 and electric mechanism 14 disposed adjacent to the magnet mechanism 12. Then there is the step of separating the particles with the magnetic force from the magnet mechanism 12 and the electric force from the electric mechanism 14.

Preferably, providing a separation step includes the steps of imparting and electric charge to the particles. Before the separating step there is preferably the step of applying a voltage difference between the magnet mechanism 12 and the electric mechanism 14. Preferably, the separating step includes the step of rotating the magnetic magnet mechanism 12 about a horizontal axis 20 so particles which are magnetic are attracted to the magnet mechanism 12 but repelled by inertia and electrical forces of the electric mechanism 14 if the particles are charged the same as the magnet, with the balance of forces of each particle including aerodynamic drag dictating where each particle goes as the magnet mechanism 12 rotates.

Figure 6A:
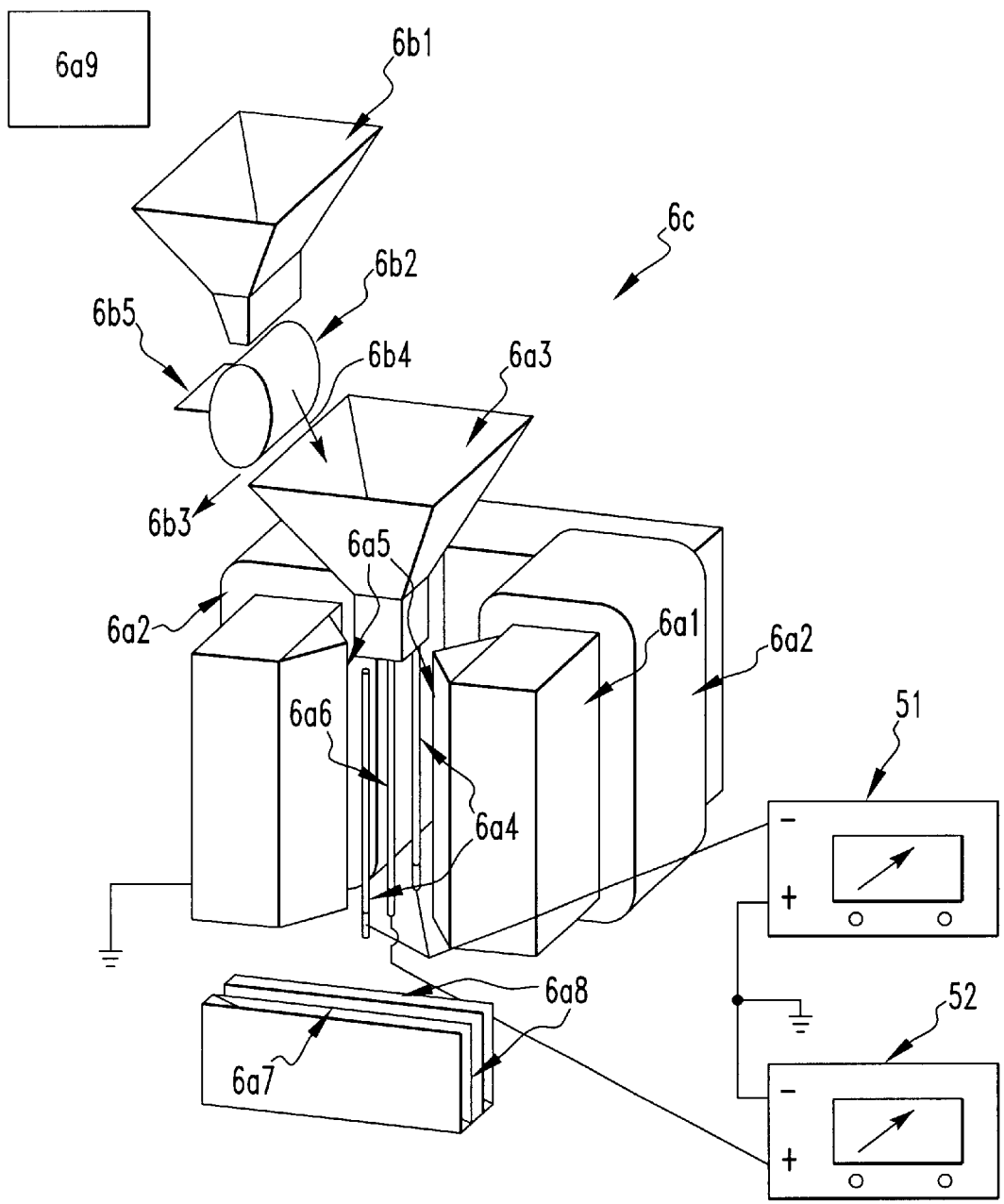
FIG. 6a is a perspective view of an electric and magnetic separator used to separate feebly paramagnetic and diamagnetic particles with differing surface electric charging characteristics.
Figure 7:
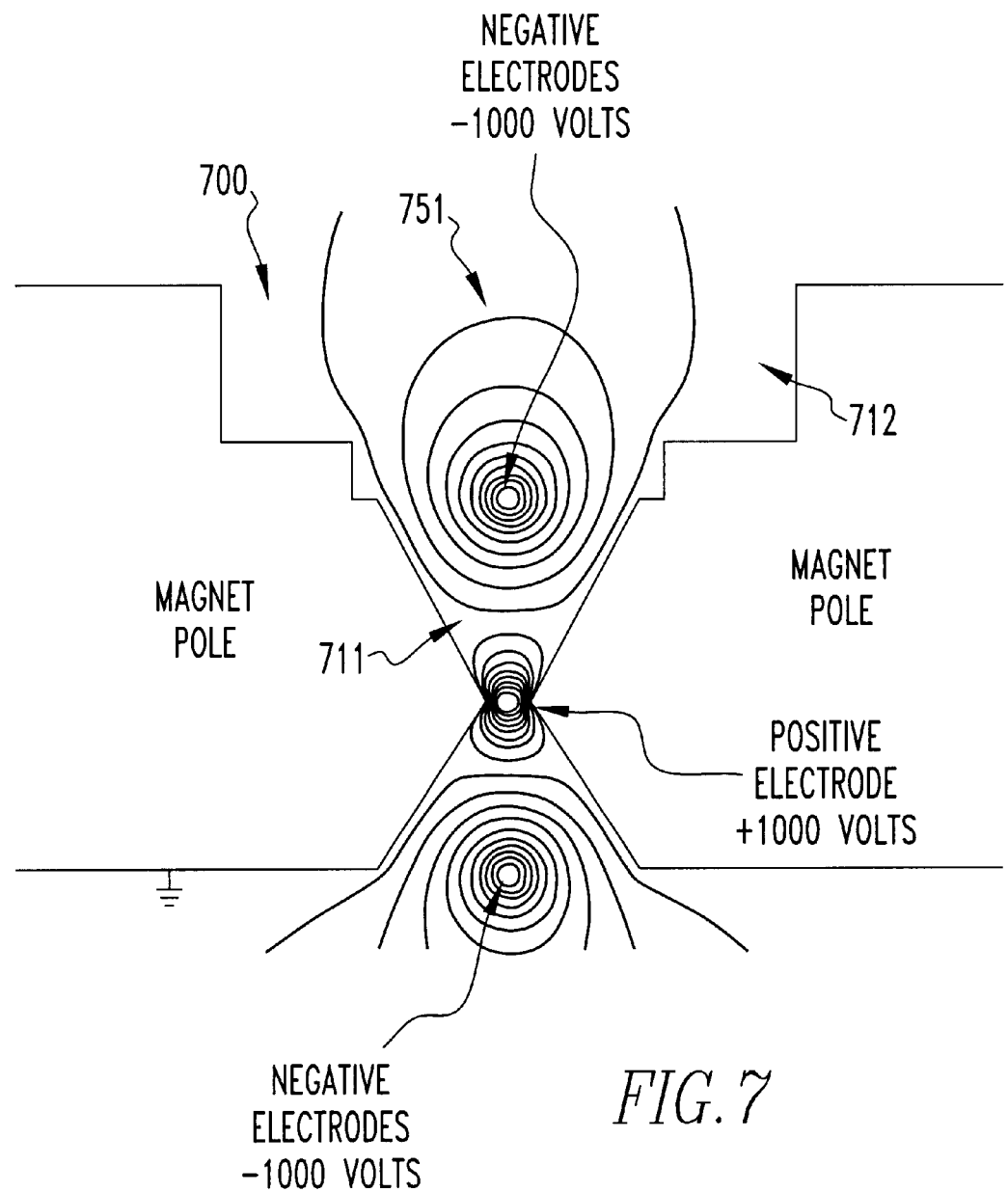
FIG. 7 shows the lines of electric equipotential in the space between the magnet poles of an alternative embodiment of the present invention.

The present invention pertains to an apparatus for sorting material having paramagnetic material and diamagnetic material. The apparatus comprises a region 6a9 for introducing triboelectric charge to the paramagnetic material and the diamagnetic material, as shown in FIG. 6a. The apparatus comprises a magnetic region 700 having stronger magnetic fields 711 and weaker magnetic fields 712, as shown in FIG. 7, that cause paramagnetic material to move to the stronger magnetic fields and diamagnetic material to move to the weaker magnetic fields. The apparatus comprises an electric region 751 overlapping with the magnetic region having an electric field which causes positively charged diamagnetic material to move in a first direction and negatively charged diamagnetic material to move in a second direction different from the first direction. The magnetic region and electric region are in communication with the region for introducing triboelectric charge.

Preferably, the magnetic region includes opposing magnetic poles. The electric region preferably includes a first electrode and at least one second electrode oppositely charged from the first electrode. Preferably, the region for introducing triboelectric charge includes a vibratory feeder and conveyor belt that moves the paramagnetic material and diamagnetic material to the magnetic region and the electric region. The first electrode and the second electrode preferably are disposed between the magnetic poles.

The present invention pertains to a method for sorting material having paramagnetic material and diamagnetic material. The method comprises the steps of introducing triboelectric charge to the paramagnetic material and the diamagnetic material. There is the step of applying a magnetic force to the paramagnetic material and the diamagnetic material to separate the paramagnetic material from the diamagnetic material. There is the step of applying an electric force, which acts in conjunction with the magnetic force, to the diamagnetic material to separate positively charged diamagnetic material from negatively charged diamagnetic material.

In the operation of the preferred embodiment, the range of application of dry magnetic separation technology can be greatly extended by incorporation of triboelectric forces. Electrical charging by friction can implant positive or negative electric charges depending on the surface characteristics of the particles. In the case of fly ash, the inorganic cenospheres and the carbon chards can have significantly different surfaces, even though the composite volume magnetism may be similar. For nanosized magnetite particles, the surface electrical characteristics can be similar while the volume magnetism is strongly dependent upon particle size. By adding a suitable electric field, frictional charging can be used to create electric forces of separation which either add or subtract to the magnetic forces. In this fashion, carbon particles with magnetism similar to that of the cenospheres can be separated by the combined force field. Further, the charge per unit mass, e/m, for tribocharged particles increases as the particle size falls below roughly 30–40 microns so the triboelectric acceleration increases as the particle size decreases. Since the magnetic acceleration is independent of particle size, the magnetic force on small particles is limited by the magnetic energy gradient, B B, and generally decreases as the particle size decreases. The triboelectric and magnetic force fields complement one another. Modifying dry magnetic separation technology to include frictional charging will extend the application to small particles of both strongly and weakly magnetic characteristics. This can be very important in industries such as pharmaceuticals, minerals including coal, magnetic recording media, environmental, etc.

Addition of the triboelectric force presents an interesting opportunity. Electron transfer or tribocharging is caused by differences in the contact potential between dissimilar surfaces. A material with a low work function will give electrons to a material with a higher work function. In frictional contact of silicon dioxide, work function 5.5 eV, with a copper surface of work function 5.0 eV, and of carbon particles, work function 4.0 eV, with the copper surface, the $SiO_2$ will become negatively charged and the carbon will acquire a positive charge. This mechanism naturally creates the charge difference necessary to separate these two materials.

By adjusting the polarity of the imposed voltage difference, the electric and magnetic forces can be made to add to or to subtract for a particle of charge e and magnetic moment $\mu$. For the particle and field parameters shown in Table I, which are characteristic of the coal cleaning application, the electric and magnetic accelerations, (e/m) V/d and $3\chi_g/\mu_o*B\nabla B$, respectively, are comparable. Addition or subtraction of the forces can have a significant effect on separation.

TABLE I

Particle and Force Field Characteristics for Fly Ash Application

| Quantity | Value | Units |
| --- | --- | --- |
| Charge to Mass Ratio | $10^{-5}$ | Coulombs per kg |
| Magnetic Susceptibility, $\chi_g$ | 20 | $10^{-9}$ m$^3$/kg |
| Potential Difference | 5000 | Volts |
| Electrode Spacing | 0.01 | meters |
| Magnetic Energy Gradient | 100 | tesla$^2$/meter |
| Permeability of free space, $\mu_o$ | $4\pi*10^{-7}$ | henry/m |

The apparatus 10, otherwise known as the ElectriMag Separator, is significantly different from state-of-the-art magnetic separators in that an added and novel triboelectric force field is employed. The present invention is different from prior art magnetic separators which employ electrically conducting poles. In the present art no means are employed to overcome the effects of inadvertent triboelectric charging. This charging can result in misplaced material, especially small particles generally finer than 10–100 microns diameter, in the magnetic fraction. This imposes a limitation in the application of the technology. The addition of the electric field in the present invention can overcome limitations of the magnetic separation which are associated with the electric force of attraction from image charges. This can be accomplished by adjustment of the electric potential on the surface of the pole of the magnetic separator. Indeed, a broader slate of products can be made using the present invention since particles can be separated using both electric and magnetic forces. Additionally, the electric potential differences used in the combined method can be significantly smaller than those required for a purely triboelectric method such as taught in U.S. No. 4,839,032, "Separating Constituents of a Mixture of Particles," David R. Whitlock, (Jun. 13, 1989), incorporated by reference herein, and the particle size range over which the combined method can be employed is much greater.

The mechanical design of the system is shown in FIG. 1. The unit has an electrode 22 and flow dividers located at the magnet end of the belt 26 feeder. The electrode 22 is movable and can be placed at various distances from the surface of the magnet with angles from the horizontal ranging from zero to 90 degrees. A vibratory tray 24 and conveyor belt 26 feed particles to the separator and impart triboelectric charges to the particles by friction associated with vibration, contact charging, and sliding. Tramp iron magnet 35 is used to separate strongly magnetic particles from the feed stream before they reach the magnetic separator 12. For the configuration shown, the magnet surface is electrically grounded. The potential applied to the electrode is negative with respect to the surface of the magnet. It can be either positive or negative.

A mixture containing particles of differing electrical surface charging and magnetic characteristics is fed from the bottom of the hopper 28 onto the surface of the vibratory tray 24. The feeder surface can be insulating or metallic and is of such a nature that it will transfer electrons from one particle-type in the mixture to the other. If the particles are composed of a mixture of carbonaceous and inorganic minerals such as constitute raw coal, for example, a copper surface is preferred. The feeder imparts triboelectric charges to the particles by frictional contact with the surfaces and by particle-particle contact. It also controls the rate at which particles are fed onto the surface of the moving belt 26 at the idler pulley 36 end of the conveyor belt 26. The belt 26 speed is controlled by a drive motor 61 which changes the rate of rotation of the magnet pulley, RPM, around a horizontal axis 20 which is parallel to the length of the cylindrical magnet in FIG. 1.

Figure 2:
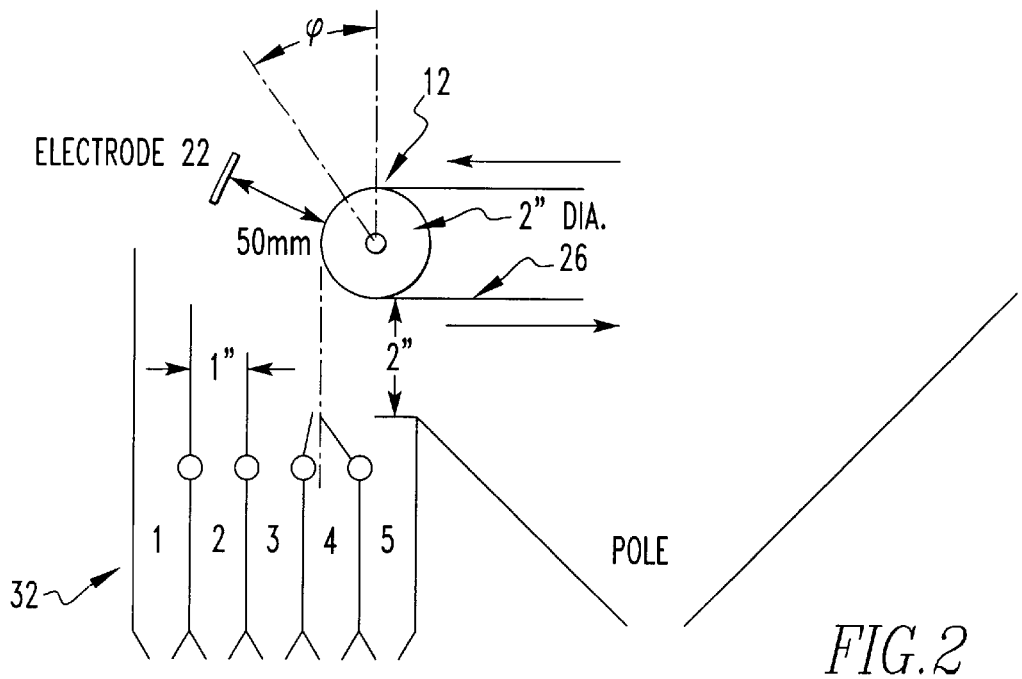
FIG. 2 is a schematic representation of a splitter configuration.

FIG. 2 is a vertical section midway along the length of the cylindrical magnet. ϕ is the angle with respect to the vertical at which the positively charged and weakly magnetic particles leave the surface of the rotating magnet shown in FIG. 1. Note that the width of the opening between dividers can be adjusted to control the distance from the leading edge of the magnet and that the divider openings can be adjusted by rotating the upper portion of the divider either clockwise or counterclockwise at the hinge to accommodate different opening widths.

For the configuration shown in FIG. 1 in which the magnet surface is grounded and the electrode 22 is negative with respect to the magnet surface, negatively charged magnetic particles arriving at the magnet end of the belt 26 feeder are attracted to the surface of the magnet by electric forces and by magnetic attraction. If the particle magnetism and the electrical attraction to the magnet surface is sufficiently large to overcome the inertial force tending to throw the particles off the belt 26, then the particles will travel with the belt 26 and be collected in receivers, 4, 5 or 6 shown in FIG. 2 depending upon the magnitude of the attraction, the weakest landing in receiver 4 and the strongest landing in receiver 6. Particles for which the resultant force of attraction to the surface of the magnet is not sufficient to overcome the repulsive effect of electric, gravitational, and inertial forces will be released from the belt 26 at an angle, ϕ, with respect to the vertical which is less than 180 degrees depending upon the resultant of all of the forces involved. After leaving the surface of the belt 26 with momentum directed tangential to the surface of the magnet at the point of departure, the particles move under the influence of gravity, the electric force, and aerodynamic drag such that they land in the appropriate receiver. Particles which come in contact with the belt can pick up electric charge. This can be important if the belt is an insulator because static charges can build up during operation. The time to discharge the particles on the belt can generally range downward from 10's of seconds. Capacitive charging will not be important where the electric potential is low, generally below 1000 to 5000 volts, and the particle charging time is long compared to the residence time on the belt.

A belt scraper 37, shown in FIG. 1, is employed to remove particles clinging to the surface of the belt. When the effects of aerodynamic drag are to be avoided, the entire apparatus 10 can be incorporated inside a vacuum chamber.

In FIG. 2, divider No. 4 is shown with a narrow opening located directly below the leading edge of the magnetic separator. For this arrangement, receiver No. 4 collects particles which separate from the surface of the magnet at 90 degrees with respect to the vertical if the electric, magnetic, and inertial forces balance. The value of the magnetic susceptibility is called "the magnetic susceptibility of separation." Generally, particles landing in receivers 1, 2, and 3 of FIG. 2 are diamagnetic to weakly paramagnetic and can be positively charged while particles landing in receivers 4, 5, and 6 are strongly magnetic and can be negatively charged when the surface of the magnet is positively charged.

Referring to FIG. 2, the material collected in receiver #6 generally represents the most magnetic particles collected. For these particles the combined magnetic and electric forces at the bottom of the separator are greater than the weight of the particles so that inertial and aerodynamic forces carry them into receiver #6. The smallest of the magnetic particles in the feed to the separator tend to be concentrated in this material.

Figure 3:
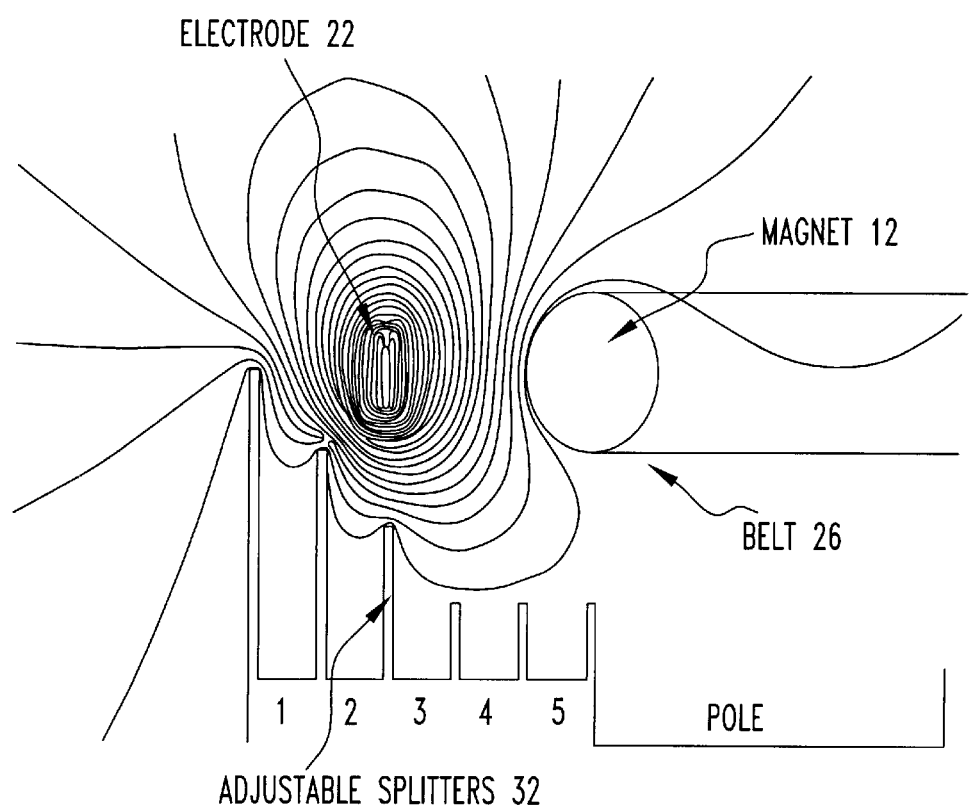
FIG. 3 shows lines of electric equipotential in the space between the flow dividers and the magnet surface.

FIG. 3 is a vertical section through the mid plane of the magnet and divider surfaces. It shows lines of equipotential between the electrode 22 and the magnet and divider surfaces. The receivers can be made from either conducting or non-conducting materials. In the figure the magnet and divider surfaces are conducting. The dimensions of the permanent magnet, which is 2.7 inches long, shown in FIG. 2 represent the separator used in the examples to follow. The splitter configuration is described in each example.

The magnet configuration which is used to produce the magnetic force of attraction is shown in FIG. 4. A vertical section through the center along the length of the magnet is shown in the figure. The magnet consists of a cylindrical arrangement of alternating segments of permanent magnets 37 separated by cylindrical carbon steel spacers 34. The permanent magnets are magnetized parallel to the axis of the cylinder and are arranged so that nearest faces are magnetized in opposite directions. In this arrangement, the magnetic flux emerges and returns radially over the outside surfaces of the carbon steel spacers 34. These surfaces are the regions of high magnetic force corresponding to high values of the magnetic energy gradient, $M_{eg}$. Any permanent magnet can be employed. Permanent magnets made from mixtures of neodymium, iron, and boron are preferred to produce large forces. The thickness of the permanent magnets 37 and the spacers 34 can be adjusted to produce maximum force on the surface of the magnet.

Figure 5:
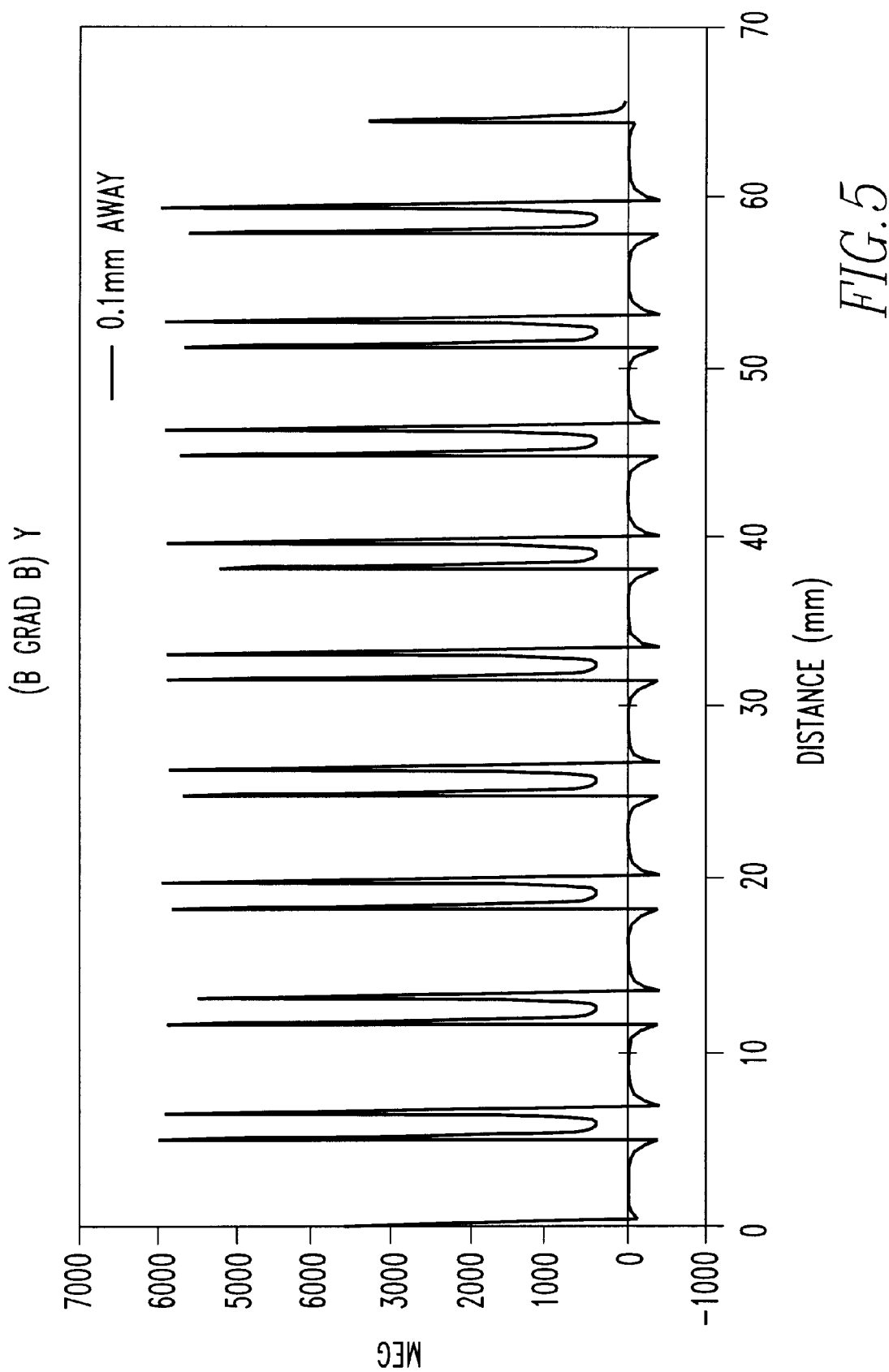
FIG. 5 shows the magnetic energy gradient near the surface of the permanent magnet separator.

Calculated values of the inward directed component of the magnetic energy gradient, $M_{eg}=(B\nabla B)$, on the surface of a belt which is 0.1 millimeters thick, are plotted versus distance x along the length of a neodymium$_2$-iron$_{14}$-boron$_1$ permanent magnet in FIG. 5. For this example, the magnet is 2 inches in diameter and 2.7 inches long. It has 10 permanent magnet wafers each of which is 0.2 inches thick and 11 wafers of carbon steel each of which is 1/16 inches thick. The structure is held together by a 3/8 inch diameter rod made from non-magnetic material which passes through a hole in the center of each permanent magnet and carbon steel spacer. The peak values of $M_{eg}$ are located at the edges of the carbon steel spacers 34. Average values of the $M_{eg}$ at various distances from the surface are shown in the legend of FIG. 5 to illustrate the change in the strength of the force with vertical distance from the surface of the magnet.

A second preferred embodiment is illustrated in FIG. 6a which is a perspective view of an open gradient dry magnetic separator with means for imposing an electric field. The combination of fields enhances the separation of particles by extending the range of particle sizes which can be separated and by enabling the separation of paramagnetic and diamagnetic particles from other paramagnetic and diamagnetic particles which have differing surface electric charging characteristics. In the figure, 6b1 is a means of feeding the particles which have been charged by suitable triboelectric means onto the surface of a rotating permanent magnet, 6b2. Strongly magnetic particles stick to the surface of the rotating magnetic separator and are removed by a scraper 6b5. The particles in the stream 6b4 have a composite magnetic susceptibility not greater than $10*10^{-6}$ cc/gm and preferably not greater than $5*10^{-6}$ cc/gm. If the strongly magnetic particles 6b3 were not removed, they would stick to the pole tips 6a5. 6a1 is the iron frame of an electromagnet which energizes the magnetic separator 6c. 6a2 are the electromagnet coils which energize the electric and magnetic separator 6c. 6a3 is a feeder for admitting weakly magnetic particles 6b4 into the separation zone of the combined electric and magnetic separator. The particles remaining after scalping will have magnetic susceptibilities generally less than nominally $10*10^{-6}$ cc/gm and will have been electrically charged via a suitable triboelectric method. 6a4 are negatively charged electrodes located in the space where diamagnetic particles would be deflected to by the magnetic force generated by the separator pole tips 6a5. A positively charged single wire electrode 6a6 extends vertically in the space between the pole tips. Knife edge splitters 6a7 are located underneath the bottom of the separator and ramps 6a8 deflect the paramagnetic and diamagnetic particles laterally out separate sides of the separator. The magnet is electrically grounded. The splitters and diverters 6a7 and 6a8 are made from non-conducting material. High voltage is supplied to the electrodes by high voltage direct current power supplies 51 and 52.

Figure 6B:
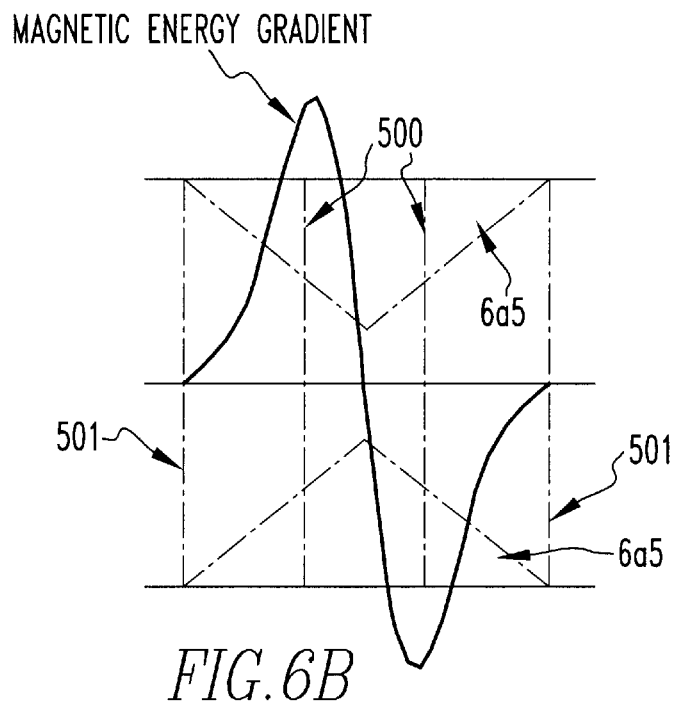
FIG. 6b shows variation of the magnetic energy gradient along a line in the mid-plane between the poles.
Figure 6C:
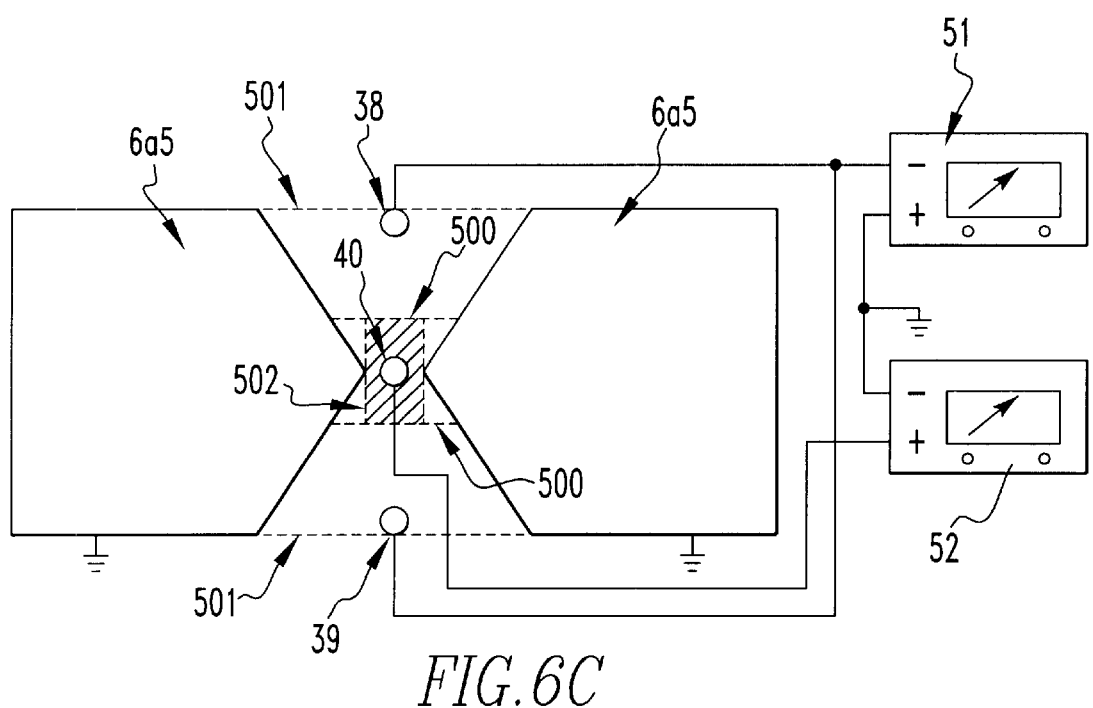
FIG. 6c is a plan view of an alternative embodiment of the present invention employing an electromagnet or permanent magnet.

This second preferred embodiment is illustrated in plan view in FIG. 6c looking from above. In this arrangement, the electrodes 38, 39, and 40 are installed between the poles 6a5 which are grounded. The magnetic separator can be constructed from an electromagnet, a superconducting magnet, or a permanent magnet. The electric potential applied to the electrodes is supplied by high voltage direct current power supplies 51 and 52. The edges 500 separate the paramagnetic and negatively charged particles from the diamagnetic and positively charged particles as they exit out the bottom of the separator. Diamagnetic and positively charged particles fall in the regions bounded by the edges 500 and 501.

The mmf of the magnetic separator can be supplied either by a conventional electromagnet or by a superconducting magnet. It can be supplied also by permanent magnets. In the arrangement of FIG. 6a, particles, 6b4, to be separated are introduced into the separator from above in a beam which is centered on the midpoint between the poles. The beam will have a width no greater than the shortest distance between the two poles. It will have a length no less than the distance separating the locations of the maximum in the magnetic energy gradient on each side of the pole tips. A general representation of the Magnetic Energy Gradient, $B\nabla B$ (gauss$^2$/cm), giving its variation along a line in the midplane equidistant from either pole is shown in FIG. 6b. The area where the particles are introduced into the top of the separator is shown as the shaded area 502 in FIG. 6c. By the action of the magnetic separator alone, paramagnetic particles will be deflected toward the pole tips as they fall through the separator. The paramagnetic particles will exit the separator underneath or near the pole tips in a region bounded on either side by the maximum magnetic energy gradient. Diamagnetic particles will be pushed outward into the regions of low field strength away from the pole tips and beyond the maxima in the magnetic energy gradient. A series of knife edges, as taught in U.S. Pat. No. 5,017,283, R. R. Oder, "A Method of Magnetic Separation and Apparatus Therefore," (May 21, 1991), incorporated by reference herein, located underneath the poles will divide the stream exiting the magnetic separator into paramagnetic and diamagnetic fractions.

It is well known that the majority of the ash forming minerals in coal are at least paramagnetic. A portion of the minerals are diamagnetic and cannot be easily separated from the diamagnetic coal using magnetic forces alone. In this invention, electrodes are introduced so that the electric force on the particles will augment the force of magnetic separation. The electric force uses the triboelectric charge difference between the particles. With coal as an example, conventional triboelectric charging using copper at the charging medium as described in "Electrostatic separation of powder mixtures bases on the work functions of its constituents", R. Gupta, D. Gidaspow and D. T. Wasan, Powder Technology, 75 (1993) pp. 79–87, incorporated by reference herein, generally results in the mineral particles being negatively charged while the clean coal fraction is positive. In this fashion, diamagnetic minerals with negative electric charge can be electrically separated from diamagnetic coal with positive electric charge in a magnetic separator when an electric force is also applied which is comparable to or larger than the magnetic force on the diamagnetic particles.

FIG. 6c shows four different electrodes. With coal in mind, electrodes 38 and 39 are negative with respect to ground.

Electrode 6a5 is both magnet poles which are grounded. Electrode 40 can be placed at a potential which is positive with respect to ground. In this fashion, positively charged diamagnetic coal particles are attracted to the electrodes 38 and 39 by both electric and magnetic forces, while negatively charged mineral particles are attracted to electrode 40 by either electric or magnetic forces, or both. The electric forces can be visualized in FIG. 7 which shows the lines of electric equipotential in the space between the magnet poles for the case where electrodes 38 and 39 are at a potential of –1,000 volts with respect to ground, the magnet poles are grounded, and electrode 40 is at a potential of +1,000 volts with respect to ground. The electric potential differs by 100 volts between lines. The electric field is intense near the electrodes 38, 39, and 40 and attracts negatively charged particles into the region near the pole tips while pulling positively charged particles into the regions of low field strength at electrodes 38 and 39. There is an additional advantage in the separation of diamagnetic particles when electrodes as described above are used. With magnetic forces only, the force on diamagnetic particles is generally weaker than on paramagnetic particles because of the generally low values of the diamagnetic susceptibility, of the order of $-0.5*10^{-6}$ cc/gm whereas paramagnetism can range from zero to values of $+10*10^{-6}$ cc/gm for streams which have been scalped of strongly paramagnetic particles. Additionally, the force on diamagnetic particles drops rapidly to an insignificant value in the region where the diamagnetic particles wind up because the distance between poles is greater than at the midpoint. The field and the field gradient is low in this region, hence all magnetic forces are small. Addition of the negative electrode there enhances the attraction of the positively charged and diamagnetic particles.

It is known that the triboelectric charge per unit mass increases as the size of the particle decreases generally below 30 to 40 microns diameter. Thus, the magnetic force, $m\chi_g B\nabla B$, where m is the particle mass, $\chi_g$ is the particle magnetic susceptibility per gram, and $B\nabla B$ is the magnetic energy gradient, will predominate for the coarse particles and the electric force, $m(q/m)E$ where q is the particle electric charge and E is the electric field, which adds to the magnetic force in this case will predominate for the fine particles in the stream fed to the separator. Because of this complimentary action, the intensity of the force of separation is increased and the range of particle sizes that can be separated is greater than that which could be achieved by either triboelectric or magnetic forces alone.

There is an additional and significant advantage of this technology in separating weakly paramagnetic and diamagnetic particles. Conventional iron electromagnets with solenoids wound from copper or other highly conducting wires are generally limited to field strengths of 20,000 gauss in the narrowest portion of the gap. With reasonable magnet size and power consumption, this has the effect of limiting the largest gap to substantially 1 inch. This in turn limits the largest size particle which can be passed easily through the gap to approximately ¼ inch diameter. In this mode of operation, magnetic energy gradients of substantially a few hundred million gauss$^2$/cm can be developed. With superconducting magnets capable of producing fields larger than 20,000 gauss, the gap opening can be increased roughly in proportion to the field strength without substantial loss of peak magnetic energy gradient. This derives from the fact that once the iron core of the electromagnet is magnetically saturated, the magnetic field gradient in the gap no longer is a function of the magnetic field strength but is inversely related to the gap between the pole tips. So, if the field strength is increased above 20,000 gauss by increasing the ampere-turns of the superconducting magnet directly in proportion to the gap then the product $B\nabla B$ is approximately constant. This means that larger paramagnetic and diamagnetic particles can be separated by the superconducting technology than by conventional electromagnets. Superconducting magnets producing 50,000 and 100,000 gauss are commercially available. At 100,000 gauss, particles as large as 1¼ inch in diameter and as small as nominally 1 micron can be separated using the combined electric and magnetic separator shown in FIG. 6a.

The above discussion illustrates the effects of adding electric fields to the magnetic fields for the case of coal particles falling through a dry magnetic separator. The applied electric potentials can be changed to accommodate the separation of negatively charged diamagnetic particles from positively charged paramagnetic particles simply by modification of the connections to the high voltage power supplies. The cylindrical electrodes shown in FIG. 6c can be replaced by electrodes which are shaped and placed to maximize the collection of the diamagnetic particles. Further, the separator described above is not restricted to particle free fall through the separation zone. Pneumatic transport could have been used as well.

EXAMPLES

Separations have been made for a series of materials to show that all dry magnetic separators which are made from metals or metallic alloys are affected by electric charges naturally implanted on particles by frictional and contact processes even with no electric potential applied to the magnet. The examples further distinguish the present invention from the state of the art separators now used by demonstrating advantages of adding electric fields to the magnetic separator.

In the examples to follow, the separator employed the permanent magnet described above. The belt 26 was 0.1 millimeter thick. It was made from Teflon coated fiberglass. The divider surfaces were made from metal and were grounded along with the surface of the magnet. The electrode 22 dimensions and electric field distribution are generally as shown in FIG. 2. Electric potential differences up to 15,000 volts were employed and electrode 22 spacings from 7 to 50 millimeters were used. Feed rates up to 20 lbm/hr were used and magnet rotational speeds between 120 and 240 RPM were employed.

Measurements of magnetic susceptibility were made using a modified Gouy Balance. [In the remainder of this patent all susceptibilities are given in units of $10^{-6}$ cm$^3$/g. Multiply this unit by $4\pi*10^{-3}$ to convert to SI units, m$^3$/kg.] Measurements of unburned carbon, Loss on Ignition (LOI) were made by ashing using a muffle furnace. Sulfur was determined using a Leco S32 Sulfur Determinator. ASTM procedures D-3174-82 and D-4239-83 were used for ash and sulfur measurements, respectively. LOI measurements were made in accordance with standard procedure 2520. An analytical balance with 1/10 milli-gram resolution was used for weight determination.

Example 1: Effects of Electric Charges

Coal particles of nominally 0.3 to 0.6 mm diameter were used to illustrate the effects of triboelectric and capacitive electric charges, electric field strength, magnetic force, and angular velocity on magnetic separation for the ElectriMag Separator. Individual particles can be either paramagnetic or diamagnetic and may exhibit either positive or negative electrical charge depending upon the surface of the particle and capacitive pickup of electric charge. The object of the experiments was to separate diamagnetic particles from paramagnetic particles in the feed.

Triboelectric Charge. A belt separator was employed to demonstrate the presence of triboelectric charge and to show that it affects magnetic separation. A mixture of particles conveyed by the belt is electrically charged by friction with the conveying apparatus or by contact between the different particles making up the mixture. Three experiments were carried out. In the first, a conventional magnetic separator of the type illustrated in FIGS. 1 and 2 was employed except that the voltage difference between the magnet surface and the electrode was zero. The magnet is electrically conducting. In the second, the permanent magnet structure is replaced by a non-magnetic aluminum cylinder of the same dimensions. Otherwise, all of the experimental apparatus was the same. The voltage difference between the aluminum cylinder and the electrode is again zero. In the third, the aluminum cylinder is replace with a non-conduction plastic cylinder of the same dimensions. As before, the remainder of the experimental apparatus was the same as for the first two steps above.

Coal particles were fed to the belt at the rate of 2.1 lbm/hr. Splitter No 1, separating receivers 1 and 2 was 6.74 cm in front of the belt. The elevation of the top of all splitters was below the bottom of the belt. Splitter No. 2, separating receivers 2 and 3, was 4.2 cm in front of the belt. Splitter No. 3, separating receivers 3 and 4, was 0.5 cm in front of the belt. Splitter No. 4, separating receivers 4 and 5, was located at the belt. A fixed splitter located 3.42 cm behind the belt separates receivers 5 and 6.

TABLE IIA

Direct Measurements of Weight and Magnetic Susceptibility

| | | Direct Measurements | | | | | |
|---|---|---|---|---|---|---|---|
| | | Magnetic Separator | | Aluminum Roller | | Plastic Roller | |
| | Receiver | Recovery Wt. % | Magnetic Susceptibility $10^{-6}$ cm$^3$/g | Recovery Wt. % | Magnetic Susceptibility $10^{-6}$ cm$^3$/g | Recovery Wt. % | Magnetic Susceptibility $10^{-6}$ cm$^3$/g |
| | 0 | | | | | | |
| | 1 | | | | | | |
| | 2 | | | | | | |
| Product | 3 | 64.49 | −0.06 | 53.12 | 0.45 | 93.44 | 0.54 |
| Refuse | 4 | 5.11 | 0.44 | 4.58 | 0.25 | 1.56 | 0.56 |
| Refuse | 5 | 12.81 | 0.95 | 11.82 | 0.09 | 2.21 | 0.69 |
| Refuse | 6 | 17.59 | 4.37 | 30.48 | 1.20 | 2.78 | 0.44 |
| Feed | Composite | 100.00 | 0.87 | 100.00 | 0.63 | 100.00 | 0.54 |

TABLE IIB

Composite Measurements of Weight and Magnetic Susceptibility

| | | Composites | | | | | |
|---|---|---|---|---|---|---|---|
| | | Magnetic Separator | | Aluminum Roller | | Plastic Roller | |
| | Receiver | Recovery Wt. % | Magnetic Susceptibility $10^{-6}$ cm$^3$/g | Recovery Wt. % | Magnetic Susceptibility $10^{-6}$ cm$^3$/g | Recovery Wt. % | Magnetic Susceptibility $10^{-6}$ cm$^3$/g |
| Feed | 3,4,5,6 | 100.00 | 0.87 | 100.00 | 0.63 | 100.00 | 0.54 |
| Product | 3 | 64.49 | −0.06 | 53.12 | 0.45 | 93.44 | 0.54 |
| Refuse | 4,5,6 | 35.51 | 2.57 | 46.88 | 0.83 | 6.56 | 0.55 |

Tables IIA and IIB show the weight and magnetic susceptibility of material collected in the various receivers for the case where the front belt roller is a magnetic separator, where the roller is a non-magnetic but conducting aluminum cylinder, and lastly where the roller is a non-magnetic and non-conduction plastic cylinder. Direct measurements of the contents of each receiver are shown in Table IIA and the characteristics of composites of the receivers are given in Table IIB. The composite of the contents of receivers 3, 4, 5, & 6 represents the feed to the separator. The product consists of the material in receiver 3. The discard or refuse fraction is found in receivers 4, 5, & 6.

The magnetic separator separates 64.49% of the weight of the feed into a diamagnetic fraction in receiver No. 3. It is the only test in which diamagnetic particles were separated. The refuse magnetic susceptibility, 2.57, is significantly higher than that of the composite of the particles, 0.87. A separation has been achieved by magnetic and other means.

The aluminum roller separates 53.12% of the feed into receiver No. 3. It is weakly paramagnetic. The refuse fraction, 46.88% of the feed, is somewhat more paramagnetic than the feed. A separation has been achieved by non-magnetic means. The physical and chemical characteristics of the material in the product and refuse fractions are different as evidenced by their differing magnetic susceptibilities. A force is required to separate the refuse fraction; otherwise, all particles would be slung outward to receiver 3. That force is electric attraction of the tribocharged particles to the conducting surface of the aluminum roller.

The plastic roller does not achieve a separation. 93.44% of the feed is slung into receiver No. 3. The composite refuse has a magnetic susceptibility which is not significantly different from that of the feed. No electric force is involved.

Dry magnetic separators with electrically conducting pole faces adjacent to the particle stream are affected by triboelectric or frictional charges on the particles. The present invention is distinguished from the present state-of-the-art separators in that it utilizes added electric potentials to overcome or improve the effects of the triboelectric charges on magnetic separation.

Triboelectric and Capacitive Charges

While the above described experiments show that triboelectric charges are present when dissimilar particles are to be separated, the following experiments were undertaken to show the added benefits that can be achieved when suitable electric potentials are employed as part of the magnetic separation.

Experiments were undertaken in which the particles were fed to the belt of the ElectriMag separator at rates between 1 and 20 Lbm/Hr while the magnet was rotated at rates from 120 RPM up to 240 RPM. The electrode was placed 5 cm from the surface of the permanent magnet at an angle of 90 degrees with respect to the vertical. Splitter No 1, separating receivers 1 and 2 was 6.74 cm in front of the belt. The elevation of the top of all splitters was below the bottom of the belt. Splitter No. 2, separating receivers 2 and 3, was 4.2 cm in front of the belt. Splitter No. 3, separating receivers 3 and 4, was 0.5 cm in front of the belt. Splitter No. 4, separating receivers 4 and 5, was located at the belt. A fixed splitter located 3.42 cm behind the belt separates receivers 5 and 6. The permanent magnet has the configuration of FIG. 1 and the dimensions given in FIG. 2. The $M_{eg}$ produced by the magnetic separator is shown in FIG. 5. The weights and the magnetic susceptibilities of the collection of particles in each of the receivers in single pass separations at 120 and 240 RPM with magnet potentials ranging from −15,000 volts to +15,000 volts are given in Table III. Material in receiver [0] was pushed off of the feed belt before entering the separation zone. It is included in the analysis. The vibratory feeder rate was maintained at 17 Lbm/Hr.

some of which are paramagnetic. Application of a negative voltage does increase weight and susceptibility of the refuse fraction, but produces only a small amount of product and leaves the amount of middling to be reprocessed the same as that prepared by the magnetic separation alone.

TABLE III

Weights and Magnetic Susceptibility of Particles Collected at 120 and 240 RPM

120 RPM

| Voltage | Receiver 0 | | Receiver 1 | | Receiver 2 | | Receiver 3 | | Receiver 4 | | Receiver 5 | | 6 | |
|---|---|---|---|---|---|---|---|---|---|---|---|---|---|---|
| | Wt. Rec. | Susc. | Wt. Rec. | Susc. | Wt. Rec. | Susc. | Wt. Rec. | Susc. | Wt. Rec. | Susc. | Wt. Rec. | Susc. | Wt. Rec. | Susc. |
| 15,000 | 1.76 | 2.43 | 1.46 | 0.12 | 21.53 | −0.06 | 39.76 | 0.06 | 3.22 | 0.61 | 22.23 | 0.77 | 10.04 | 8.06 |
| 10,000 | 0.27 | 2.72 | 0.00 | 0.00 | 6.75 | −0.01 | 62.00 | 0.18 | 4.36 | 0.94 | 15.82 | 1.07 | 10.81 | 6.97 |
| 5,000 | | | | | | | 79.02 | 0.21 | 4.41 | 1.70 | 10.80 | 2.03 | 5.78 | 9.99 |
| 0 | | | | | | | 85.26 | 0.23 | 2.71 | 2.20 | 6.95 | 3.54 | 5.09 | 8.81 |
| −5,000 | | | | | | | 81.42 | 0.30 | 3.70 | 1.90 | 8.82 | 2.62 | 6.06 | 8.94 |
| −10,000 | | | | | | | 80.15 | 0.18 | 3.89 | 1.12 | 9.79 | 1.85 | 6.17 | 11.24 |
| −15,000 | 0.23 | 1.69 | | | 2.34 | −0.04 | 61.92 | 0.11 | 5.32 | 0.59 | 17.90 | 0.64 | 12.29 | 6.59 |

240 RPM

| Voltage | Receiver 0 | | Receiver 1 | | Receiver 2 | | Receiver 3 | | Receiver 4 | | Receiver 5 | | 6 | |
|---|---|---|---|---|---|---|---|---|---|---|---|---|---|---|
| | Wt. Rec. | Susc. | Wt. Rec. | Susc. | Wt. Rec | Susc. | Wt. Rec. | Susc. | Wt. Rec. | Susc. | Wt. Rec. | Susc. | Wt. Rec. | Susc. |
| 15,000 | | | 0.59 | −0.12 | 41.31 | 0.11 | 40.88 | 0.88 | 1.45 | 1.23 | 6.23 | 2.36 | 9.55 | 4.60 |
| 10,000 | | | | | 30.62 | −0.01 | 53.06 | 0.98 | 1.69 | 1.32 | 6.37 | 1.87 | 8.26 | 6.09 |
| 5,000 | | | | | 30.01 | −0.06 | 55.21 | 0.63 | 1.53 | 1.50 | 5.54 | 2.27 | 7.71 | 8.98 |
| 0 | | | | | 52.81 | −0.09 | 39.14 | 1.42 | 0.64 | 3.24 | 2.67 | 3.94 | 4.73 | 9.63 |
| −5,000 | | | | | 61.61 | 0.01 | 30.70 | 1.55 | 0.75 | 2.82 | 2.83 | 4.04 | 4.11 | 9.87 |
| −10,000 | | | | | 55.60 | 0.13 | 36.10 | 1.05 | 0.88 | 2.65 | 3.04 | 3.95 | 4.38 | 9.11 |
| −15,000 | | | 0.61 | 0.09 | 60.36 | 0.29 | 31.01 | 1.40 | 0.80 | 2.21 | 2.94 | 3.21 | 4.27 | 9.79 |

Referring to Table III, the effect of the electric field can been seen at 120 RPM by comparing measurements at zero voltage (magnet only) with those at applied voltages up to +15,000 volts. The magnet alone can separate 85.26 Wt. % of the material into receiver 3. The material has a paramagnetic susceptibility of 0.23. No diamagnetic material was separated. The composite of the material in receivers 4, 5, and 6 has 14.74% of the sample weight with a magnetic susceptibility of 5.1 which is 22 times greater than that of receiver 3. The separation has produced a strongly paramagnetic refuse fraction but has not separated diamagnetic particles.

The effects of electric field strength and RPM can be seen most clearly by grouping the receivers according to the magnetic susceptibility of their contents as shown in Tables IVA and IVB. Receivers with diamagnetic particles, magnetic susceptibility less than zero, will be grouped into "Product." Those with paramagnetic susceptibility greater than zero but less than one will be grouped into a "Middling" composite. These particles could be subjected to a second separation to collect more "Product." Receivers with paramagnetic susceptibility greater than one will be labeled "Refuse."

In Table IVA for 120 RPM it is apparent that application of positive voltage has the beneficial effect of reducing the amount of middling to be reprocessed while separating 21.53 Wt. % of the sample into a diamagnetic fraction and 11.8 Wt. % into a strongly magnetic refuse fraction. This is consistent with a negative charge for the minerals in coal, Table IVA Product, Middling, and Refuse Fractions Prepared at 120 RPM

| 120 RPM | $\chi < 0$ Product | | $0 < \chi < 1$ Middling | | $\chi > 1$ Refuse | |
|---|---|---|---|---|---|---|
| Voltage | Recovery | Mag. Suscep. | Recovery | Mag. Suscep. | Recovery | Mag. Suscep. |
| 15,000 | 21.53 | −0.06 | 66.67 | 0.33 | 11.80 | 7.22 |
| 10,000 | 6.75 | −0.01 | 66.36 | 0.23 | 26.90 | 3.46 |
| 5,000 | | | 79.02 | 0.21 | 20.98 | 3.67 |
| 0 | | | 85.26 | 0.23 | 14.74 | 5.11 |
| −5,000 | | | 81.42 | 0.30 | 18.58 | 4.54 |
| −10,000 | | | 80.15 | 0.18 | 19.85 | 4.62 |
| −15,000 | 2.34 | −0.04 | 85.14 | 0.25 | 12.52 | 6.50 |

TABLE IVB

Product, Middling, and Refuse Fractions Prepared at 240 RPM

| 240 RPM | $\chi < 0$ Product | | $0 < \chi < 1$ Middling | | $\chi > 1$ Refuse | |
|---|---|---|---|---|---|---|
| Voltage | Recovery | Mag. Suscep. | Recovery | Mag. Suscep. | Recovery | Mag. Suscep. |
| 15,000 | 0.59 | −0.12 | 82.19 | 0.49 | 17.23 | 3.51 |
| 10,000 | 30.62 | −0.01 | 53.06 | 0.98 | 16.32 | 3.95 |
| 5,000 | 30.01 | −0.06 | 55.21 | 0.63 | 14.78 | 5.69 |
| 0 | 52.81 | −0.09 | | | 47.19 | 2.41 |
| −5,000 | | | 61.61 | 0.01 | 38.39 | 2.65 |
| −10,000 | | | 55.60 | 0.13 | 44.40 | 2.07 |
| −15,000 | | | 60.98 | 0.29 | 39.02 | 2.47 |

At 240 RPM, as shown in Table III, the magnet alone can separate 52.8 Wt. % material into Receiver 2. It is diamagnetic. The material in receiver No. 6 at 0 voltage has less weight but higher magnetic susceptibility than that at 120 RPM. From Table IVB at 240 RPM it is apparent that no middling fraction is produced by the magnet alone at zero voltage. An excess amount, 47.19%, is to be discarded in the refuse fraction. Application of 5000 volts diminishes the product from 52.81 to 30.01 Wt. % and reduces the refuse from 47.19 to 14.78 Wt. % while increasing its susceptibility from 2.41 to 5.69. This gives a middling fraction which is 55.21 Wt. % of the sample for reprocessing. No diamagnetic product is separated when the voltage applied to the surface of the magnet is negative with respect to the electrode.

It is apparent that application of an electric field in addition to the magnetic force can improve the performance of the magnetic separator. The polarity is determined by the triboelectric charge of the particles to be collected at the magnet surface.

Example 2: Coal Cleaning

Lower Kittanning coal from Clearfield County, Pa., with 26.06% ash, 7.08% sulfur, a magnetic susceptibility of 1.33 containing 0.58 Wt. % moisture was used as the test coal. Particle size ranged from 0.074 mm to 1.19 mm diameter. This coal was fed to a laboratory scale ElectriMag separator at a rate of 116.3 pounds coal per hour and processed at 0 and ±5000 volts applied at a magnet rotational speed of 100 RPM. Splitter No 1, separating receivers 1 and 2 was 6.74 cm in front of the belt. Splitter No. 2, separating receivers 2 and 3, was 1.66 cm in front of the belt. Splitter No. 3, separating receivers 3 and 4, was 1.16 cm in front of the belt. Splitter No. 4, separating receivers 4 and 5, was underneath and 0.88 cm behind the belt. A fixed splitter separating receivers 5 and 6 was located 3.42 cm behind the belt.

The "Product" is contained in receivers 1, 2, and 3. The refuse is in receivers 4, 5, and 6. The results are compared in Table V where percent reductions in ash and sulfur are compared for the three voltages versus the Btu recovery.

TABLE V

Reductions in Ash and Sulfur vs. Btu Recovery at 0 kV, −5 kV, and +5 kV

| −5 kV | | | 0 kV | | | +5 kV | | |
|---|---|---|---|---|---|---|---|---|
| Btu Recovery % | Ash Reduction, % | Sulfur Reduction, % | Btu Recovery % | Ash Reduction, % | Sulfur Reduction, % | Btu Recovery % | Ash Reduction, % | Sulfur Reduction, % |
| 83 | 32.9 | 46.1 | 86 | 39.0 | 49.8 | 88 | 36.7 | 49.8 |
| 93 | 15.1 | 30.0 | 94 | 14.9 | 29.2 | 95 | 18.5 | 33.0 |
| 97 | 7.0 | 18.6 | 98 | 6.1 | 17.4 | 97 | 8.6 | 21.7 |
| 98 | 4.2 | 12.5 | 98 | 3.8 | 11.7 | 98 | 5.4 | 15.1 |
| 100 | 0 | 0 | 100 | 0 | 0 | 100 | 0 | 0 |

Application of an electric field which makes the surface of the magnet positive with respect to the outer electrode 22 results in higher reductions of ash or sulfur at fixed Btu recovery when compared to operation at zero applied electrical potential difference. The reductions in ash and sulfur are less when the surface of the magnet is negative with respect to the outer electrode 22. The carbonaceous component of the test coal has a positive triboelectric charge while the mineral rich component has a negative triboelectric charge. Application of a positive potential difference to the surface of the magnetic separator improves the removal of unwanted ash and sulfur bearing minerals without adverse effects on the recovery of the clean coal component.

Example 3: Activated Carbon—Fly Ash Blends

Activated carbon was obtained from Fisher Scientific. The carbon ranged in size from 74 microns to 297 microns particle diameter was scalped with a conventional permanent magnet to remove magnetic impurities and to produce a diamagnetic feedstock. This material had a magnetic susceptibility of −0.36, 3.66 Wt. % ash, and Loss On Ignition (LOI) of 96.34 Wt. %. Separately, a fly ash sample from a pulverized coal fired power plant was burned to remove all unburned carbon and volatiles. The resulting material was 100% ash, with a magnetic susceptibility of 500. It exhibited no LOI. This material was 100% finer than 248 microns and had a mass mean particle diameter of 37.4 microns. A blend was prepared consisting of 10.09 Wt. % activated carbon and 89.91 Wt. % treated fly ash. The blend had a magnetic susceptibility of 449.6, 90.28 Wt. % ash and 9.72 Wt. % LOI.

The blend was treated in single pass processing in the laboratory ElectriMag separator at potential differences of 0 and + and −5000 volts. Splitter No 1, separating receivers 1 and 2 was 6.74 cm in front of the belt. Splitter No. 2, separating receivers 2 and 3, was 4.2 cm in front of the belt. Splitter No. 3, separating receivers 3 and 4, was 1.66 cm in front of the belt. Splitter No. 4, separating receivers 4 and 5, was underneath and 0.88 cm behind the belt. A fixed splitter separating receivers 5 and 6 was located 3.42 cm behind the belt. The results are compared in Table VI where reductions of LOI are given versus weight recovery. The objective was to maximize the reduction in LOI in the product and the weight recovery for the strongly magnetic reject fraction.

TABLE VI

Results of Processing Blend of Activated Carbon and Fly Ash Blend 1

| −5 kVDC | | | 0 kVDC | | | +5 kVDC | | |
|---|---|---|---|---|---|---|---|---|
| Wt. % | LOI | % Red. | Wt. % | LOI | % Red. | Wt. % | LOI | % Red. |
| 90.1 | 1.9 | 81.6 | | | | 87.4 | 0.3 | 96.9 |
| 91.1 | 2.2 | 78.2 | 86.7 | 0.5 | 94.8 | 89.4 | 0.5 | 95.4 |
| 91.8 | 2.9 | 72.2 | 91.5 | 1.4 | 84.6 | 91.1 | 2.0 | 79.7 |
| 93.6 | 4.4 | 57.1 | 94.1 | 3.9 | 58.1 | 95.9 | 6.5 | 34.4 |
| 100.0 | 10.3 | 0.0 | 100.0 | 9.2 | 0.0 | 100.0 | 9.9 | 0.0 |

An ideal separation would recover 89.9% of the weight while removing 100% of the activated carbon. By interpolation of the results for to a common weight recovery of 89.9%, at a magnet potential of +5,000 volts, the laboratory separator reduced the LOI by 91%. The magnet alone, at zero potential difference, reduced the LOI by 89%. At −5,000 volts potential difference, the separator reduced the LOI by 82%. Application of the positive potential improved both weight recovery and reduction of LOI for this application.

The reductions in LOI and the weight recoveries observed for the magnetic separator without electric field assistance (zero voltage) represents performance limits for the magnet when operating at 100 RPM. The magnetic separator cannot separate more carbon from the mixture than these limits whereas applying an electric potential to the magnetic separator allows separation of additional carbon bearing particles that could not be separated by the magnet operating alone.

Example 4: Fly Ash

Fly ash samples were obtained from a coal fired power plant which had been retrofitted with low $NO_X$ burners. Table VII shows the characteristics of the screen fractions of the fly ash. The screen fractions are given in terms of mesh screen sizes (see Chemical Engineers' Handbook, 5th Edition, Robert H. Perry and Cecil H. Chilton, McGraw-Hill Book Company, New York, 1973). The LOI is greatest in the coarsest screen sizes where the magnetic susceptibility is least.

TABLE VII

Screen Fractions of Fly Ash Samples

| Size (Mesh) | Wt. % | Moisture (Wt. %) | LOI (Wt. %) | Magnetic Susceptibility ($10^{-6}$ cm$^3$/g) |
|---|---|---|---|---|
| +100 Mesh | 2.61 | 0.31 | 24.34 | 243.6 |
| 100 × 200 Mesh | 13.89 | 0.29 | 15.18 | 325.0 |
| −200 Mesh | 83.51 | 0.37 | 6.52 | 451.2 |
| Composite | 100.00 | 0.36 | 8.19 | 428.25 |

The fly ash was processed as-received using the belt 26 magnetic separator shown in FIGS. 1 and 2 with the applied electric potential difference zero. The fly ash was fed to the belt 26 at the rate of 9.24 Lbm/Hr and the magnet was rotated at the rate of 100 RPM. Splitter No 1, separating receivers 1 and 2 was 6.74 cm in front of the belt. Splitter No. 2, separating receivers 2 and 3, was 4.2 cm in front of the belt. Splitter No. 3, separating receivers 3 and 4, was 0.5 cm in front of the belt. Splitter No. 4, separating receivers 4 and 5, was 0 cm in front of the belt. A fixed splitter separating receivers 5 and 6 was located 3.42 cm behind the belt. The results of that separation are shown in the left hand portion of Table VIII. Using the magnet alone, 17.07 Wt. % of the material can be recovered with a LOI of 5.63%. This is a 30.4% reduction in the LOI.

TABLE VIII

Distribution of Products at V = 0 and V = 20,000 Volts, Single Pass Separation

| | V = 0; Magnet Alone | | | V = 20,000 Volts, ElectriMag | | |
|---|---|---|---|---|---|---|
| Receiver | Wt. % | LOI (Wt. %) | Magnetic Suscepti- bility ($10^{-6}$ cm$^3$/g) | Wt. % | LOI (Wt. %) | Magnetic Suscepti- bility ($10^{-6}$ cm$^3$/g) |
| 0 | | | | | | |
| 1 | | | | | | |
| 2 | | | | 0.34 | 10.10 | 86.6 |
| 3 | | | | 0.72 | 9.53 | 265.8 |
| 4 | 0.28 | 9.14 | 549.2 | 0.53 | 8.32 | 529.9 |

TABLE VIII-continued

Distribution of Products at V = 0 and V = 20,000 Volts, Single Pass Separation

| | V = 0; Magnet Alone | | | V = 20,000 Volts, ElectriMag | | |
|---|---|---|---|---|---|---|
| Receiver | Wt. % | LOI (Wt. %) | Magnetic Susceptibility ($10^{-6}$ cm$^3$/g) | Wt. % | LOI (Wt. %) | Magnetic Susceptibility ($10^{-6}$ cm$^3$/g) |
| 5 | 82.59 | 8.59 | 427.9 | 77.79 | 8.51 | 388.4 |
| 6 | 17.07 | 5.63 | 513.2 | 20.63 | 5.81 | 619.1 |
| Composite | 99.94 | 8.09 | 442.8 | 100.01 | 7.96 | 434.8 |

A representative sample of fly ash was taken from the same source and processed with the belt 26 separator using −20,000 volts applied to the electrode 22 which was placed 5 cm from the front of the magnet which was grounded. The fly ash was fed to the belt 26 at the rate of 9.22 Lbm/Hr and the magnet was rotated at the rate of 100 RPM. The splitter was configured as above. The right hand portion of Table VIII shows the characteristics of isolates separated from the fly ash material under these conditions. Application of the high voltage separates negatively charged and strongly paramagnetic particles from receiver 5. They are deposited in receiver 6 where both weight recovery and magnetic susceptibility increase. Carbon rich particles are displaced from receivers 5 and 6 into receivers 2, 3, and 4. They have LOI values ranging upward to 10.10 and magnetic susceptibilities ranging downward to 86.6. They are paramagnetic and less negative than particles moving to the magnet surface. Negatively charged and strongly paramagnetic particles moved to the pole fraction.

The material with the highest unburned carbon content and the least magnetic susceptibility is displaced the farthermost into receiver 2. No material was displaced into that receiver with the magnet acting alone. The result of this "single pass" separation is a 21% increase in weight recovery and magnetic susceptibility of the particles in receiver 6 with only a 3% increase in LOI. The electric and magnetic fields are acting together to separate carbon-rich particles not separable by the magnetic separator acting alone.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An apparatus for sorting particles comprising:
   a magnet mechanism for separating the particles with a magnetic force, the magnet mechanism rotates about a horizontal axis, the magnet mechanism comprises a cylindrical arrangement of alternating segments of permanent magnets separated by steel spacers, where the permanent magnets are magnetized parallel to the axis of the cylinder and are arranged so that the nearest faces are magnetized in opposite directions with the magnetic flux from the magnet emerging radially over the surfaces of the steel spacers;
   an electric mechanism for separating particles with an electrical force disposed adjacent to the magnet mechanism, the electric mechanism includes an electrode, said electrode disposed adjacent the magnet mechanism so a voltage difference is applied between the electrode and the magnet mechanism, particles which are magnetic will be attracted to the magnet mechanism but repelled by inertia and electrical forces if they are charged the same way as the magnet mechanism, with a balance of forces on each particle dictating where the particle goes as the magnet mechanism rotates; and
   a mechanism for providing the particles to the magnet mechanism and the electric mechanism, said providing mechanism engaged with the magnet mechanism and the electric mechanism, the providing mechanism includes a mechanism for imparting an electric charge to the particles, the imparting mechanism includes a vibratory tray upon which the particles are vibrated and creates triboelectric charges in the particles by contact of the particles with the vibratory tray and with each other, the imparting mechanism includes a feeder belt which receives particles from the vibratory tray and carries them to the magnet mechanism and creates triboelectric charges in the particles by contact of the particles with the feeder belt and with each other, the feeder belt has an electric charge which charges the particles when the particles contact the belt.

2. An apparatus as described in claim 1 wherein the providing mechanism includes a feeder hopper through which the particles are fed to the vibratory tray.

3. An apparatus as described in claim 2 wherein the particles release from the magnet mechanism at various angular locations around the axis of rotation depending upon the angular velocity of rotation, the radius of the magnet mechanism, the voltage applied to the magnet mechanism, the magnetic force of attraction produced by the magnet mechanism, the electrical time constants of the belt and particles, and the size, weight and the magnetism and the electric charge of the particles.

4. An apparatus as described in claim 3 including mechanical splitters aligned with the magnet mechanism which separates particles that leave the magnet mechanism into streams of differing magnetic, electric, mechanical and chemical attributes.

5. An apparatus as described in claim 4 wherein the mechanical splitters are either conducting or insulating.

6. An apparatus as described in claim 5 wherein the voltage is up to 20,000 volts.

7. An apparatus as described in claim 6 wherein the electrode is as close as 7 millimeters with the magnet.

8. An apparatus as described in claim 7 wherein the electrode is located from 0 degrees to 90 degrees with respect to the horizontal axis.

9. An apparatus as described in claim 8 wherein the particles are between 0.05 micron and 2.4 millimeters in diameter.

10. An apparatus as described in claim 9 wherein particles with low work function give up electrons and become positively charged, while particles with large work function acquire electrons and become negatively charged.

11. An apparatus as described in claim 10 wherein the particles are diamagnetic or paramagnetic or ferromagnetic or anti-ferromagnetic or mixtures thereof.

12. An apparatus as described in claim 11 wherein the magnet rotates at a variable speed to enhance the electric and magnetic separation of the particles.

13. An apparatus for sorting material having paramagnetic material and diamagnetic material comprising:
   a region for introducing triboelectric charge to the paramagnetic material and the diamagnetic material;
   a magnetic region having stronger magnetic fields and weaker magnetic fields that cause paramagnetic material to move to the stronger magnetic fields and diamagnetic material to move to the weaker magnetic fields, the magnetic region includes opposing magnetic poles; and an electric region overlapping with the magnetic region having an electric field which causes positively charged diamagnetic material to move in a first direction and negatively charged diamagnetic material to move in a second direction different from the first direction, the magnetic region and electric region in communication with the region for introducing triboelectric charge, the electric region includes a first electrode and at least one second electrode oppositely charged from the first electrode, the first electrode and the second electrode are disposed between the magnetic poles.

14. An apparatus as described in claim 13 wherein the region for introducing triboelectric charge includes a vibratory feeder and conveyor belt that moves the paramagnetic material and diamagnetic material to the magnetic region and the electric region.

15. A method for sorting material having paramagnetic material and diamagnetic material comprising the steps of:

introducing triboelectric charge to the paramagnetic material and the diamagnetic material;

applying a magnetic force to the paramagnetic material and the diamagnetic material to separate the paramagnetic material from the diamagnetic material; and applying an electric force, which acts in conjunction with the magnetic force, to the diamagnetic material to separate positively charged diamagnetic material from negatively charged diamagnetic material.

16. A method as described in claim 15 wherein the introducing step includes the steps of imparting an electric charge to the particles.

17. A method as described in claim 16 including before the applying step, there is the step of applying a voltage difference between a magnet mechanism and an electric mechanism.

18. A method as described in claim 17 including the step of rotating the magnet mechanism about a horizontal axis so particles which are magnetic are attracted to the magnet mechanism but repelled by inertia and electrical forces of the electric mechanism if the particles are charged the same as the magnet, with the balance of forces of each particle dictating where each particle goes as the magnet mechanism rotates.

19. A method as described in claim 18 wherein the imparting step includes the step of carrying the particles on a feeder belt to the magnet mechanism and creating triboelectric charges in the particles by contact of the particles with the feeder belt and with each other.

20. A method as described in claim 19 including the step of feeding the particles to the feeder belt from a vibratory tray.

21. A method as described in claim 20 wherein the separating step includes the step of separating diamagnetic minerals from coal.

* * * * *